June 13, 1967     D. O. LAVALLEE     3,324,573
EDUCATIONAL DEVICE
Filed Oct. 12, 1964                                                      3 Sheets-Sheet 1
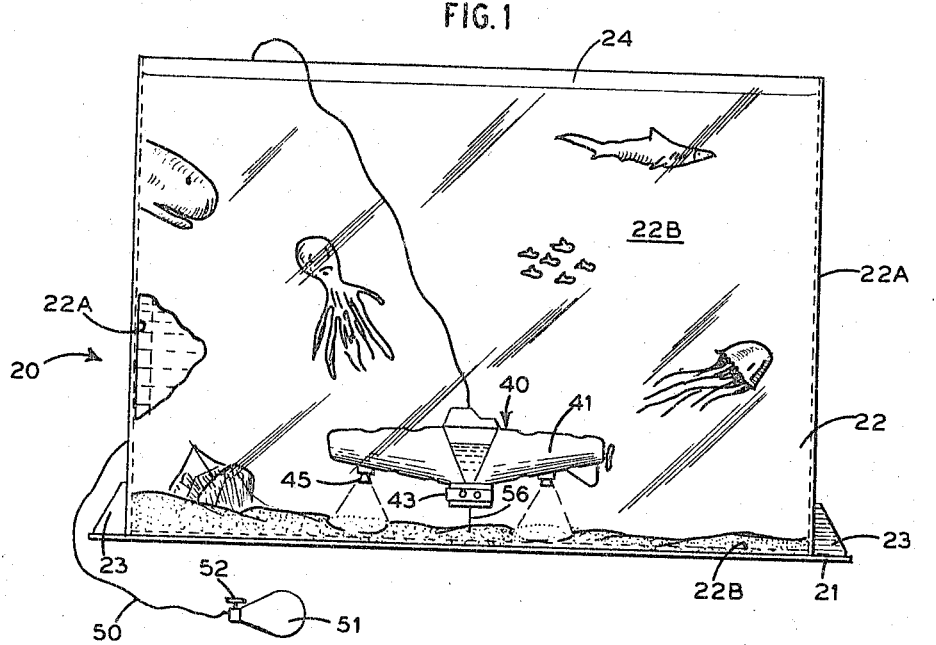
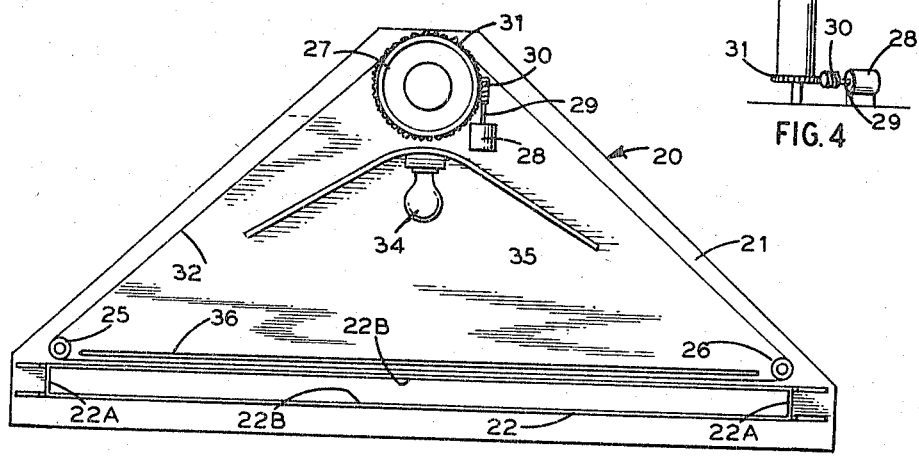
FIG. 3
INVENTOR.
David O. Lavallee
BY
ATTORNEY June 13, 1967   D. O. LAVALLEE   3,324,573
EDUCATIONAL DEVICE
Filed Oct. 12, 1964   3 Sheets-Sheet 2
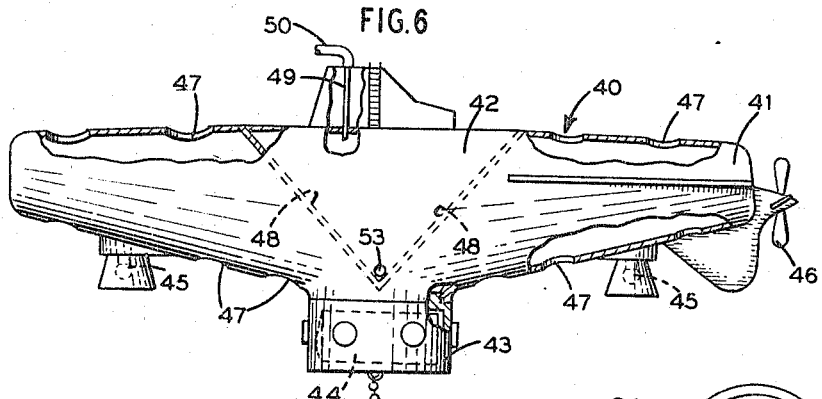
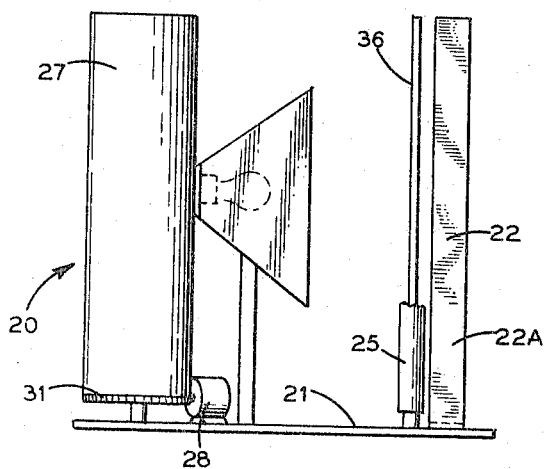
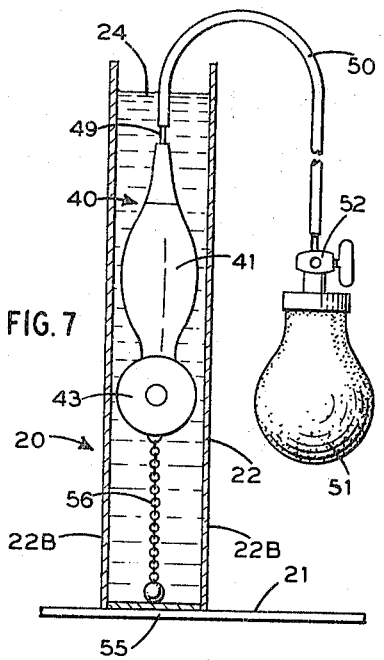
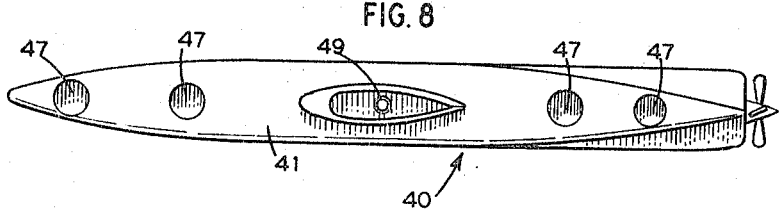
INVENTOR.
David O. Lavallee
BY
*Irving Seidman*
ATTORNEY June 13, 1967 D. O. LAVALLEE 3,324,573
EDUCATIONAL DEVICE
Filed Oct. 12, 1964 3 Sheets-Sheet 3
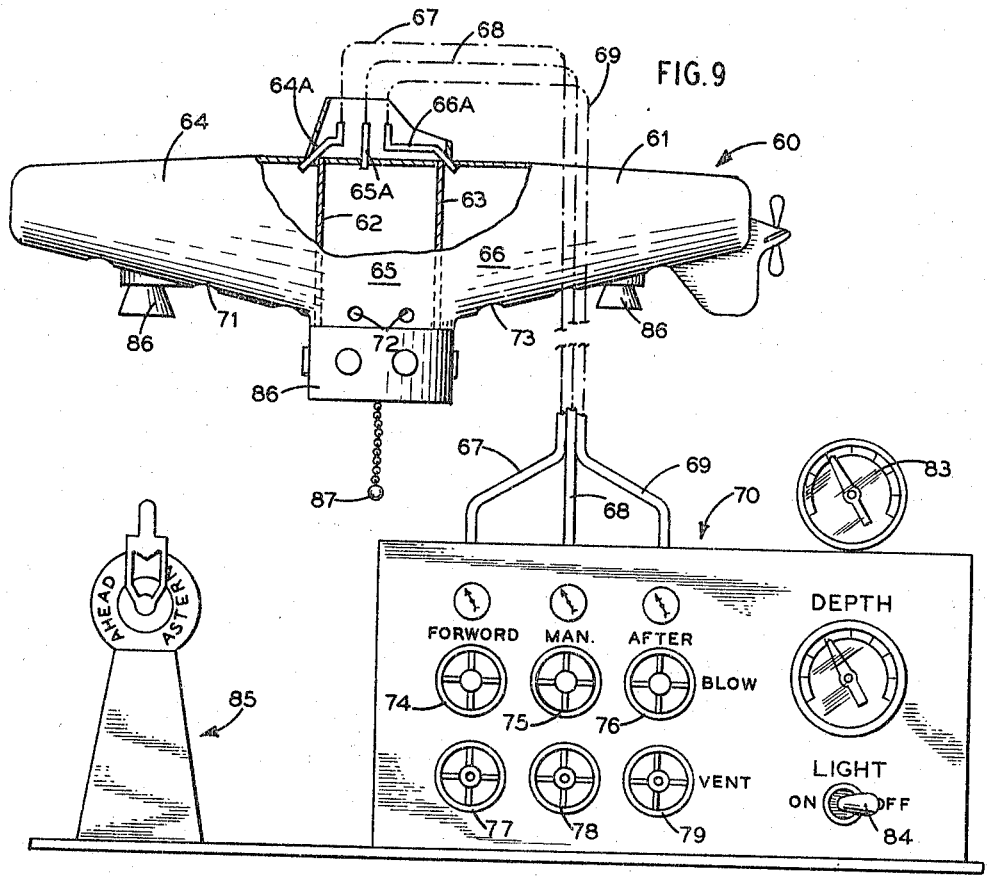
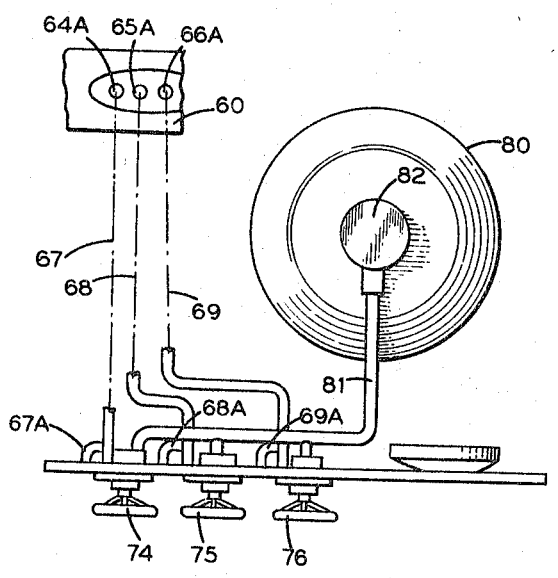
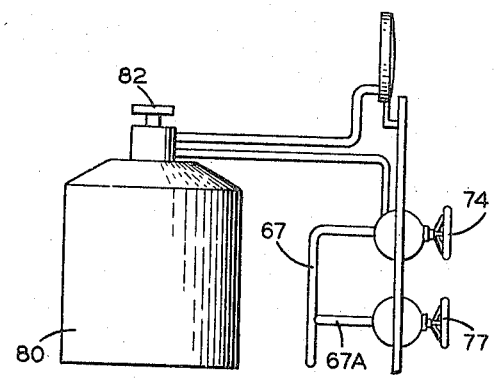
INVENTOR.
David O. Lavallee
BY
*Irving Seidman*
ATTORNEY

United States Patent Office 3,324,573
Patented June 13, 1967

3,324,573
EDUCATIONAL DEVICE
David O. Lavallee, 333 E. 43rd St.,
New York, N.Y. 10017
Filed Oct. 12, 1964, Ser. No. 403,139
12 Claims. (Cl. 35—19)

This invention relates in general to an educational device, and more specifically to an educational device or toy to demonstrate the physical laws of buoyancy and at the same time present a study of oceanography and the various marine life found therein.

With the present-day ever increasing quest for knowledge, more and more emphasis is being placed on the exploration of the vast oceans of the world. To date, the gathering of information about oceanography has been limited to only a very few persons, and knowledge discovered being disseminated to only limited numbers of interested persons. Almost daily new and great discoveries in oceanography are being made and many undersea vehicles are being constructed by branches of the various governments to explore the vast unknown beneath the sea.

It is therefore an object of this invention to bring to the attention of children who are to be the potential future scientists and engineers an interesting and amusing educational device which will interest and stimulate them in the science of oceanography.

It is another object of this invention to provide a study of oceanography which is realistic and factual in form.

It is another object of this invention to provide an educational device in the form of an amusing and interesting toy capable of demonstrating the physical laws of buoyancy with actual moving models of submersible vehicles.

Still another object of this invention is to provide an educational device which will visibly demonstrate marine life and ocean topography.

Still another object of this invention is to provide an interesting and amusing educational device which is of interest to persons of all ages, and which can be readily utilized in schools and classrooms for teaching oceanography.

Still another object of this invention is to provide an educational device which is relatively simple in construction, relatively inexpensive to fabricate, and which is realistic and positive in operation.

The above objects and other features and advantages of this invention are attained by an educational device constructed and arranged to demonstrate the physical laws of buoyancy and at the same time illustrate the various specimens of marine life that inhabit the oceans of the world at every depth thereof. This is attained by the utilization of a water box or aquarium in which models of various submersibles can be actually manipulated against a continuously moving background depicted with authentic reproductions of the various marine life found in the surrounding sea. The construction and arrangement of the submersible models are such that they will move in a vertical plane only with apparent horizontal motion being achieved by moving a background screen behind the water box or aquarium. Accordingly, the submersible models submerge and surface in the body of water contained within the aquarium by means of air pumped therein to displace the water therein; thereby rendering the submersible buoyant. Means are provided for rendering the same buoyant by air which is supplied from a source maintained in the control of an operator. Means are also provided for illuminating the moving screen and for imparting an optical illusion of horizontal motion of the submersible relative thereto. Means in the form of a motor drive effect the movement of the screen.

Accordingly, the various marine life which exist in the ocean are depicted on the screen in their proper relationship with respect to their respective natural depth, that is, fish such as sharks, porpoises, whales, schools of tunas, etc. will be depicted near the top of the screen against a light blue background. Creatures of the middle depth such as giant squid, deep diving whales, giant jellyfish will be depicted at an intermediate level against a background graduating into a deeper blue. The great ocean depths will be depicted adjacent the lower end of the screen in a very dark blue background on which the abyssial fish will appear with their bio-luminescence glowing in the dark.

It is contemplated that the illustrations on the screen be authentic reproductions of known creatures taken from reliable zoological and biological studies. If desired, a small booklet can also be provided with the device to identify and describe that which is known of the marine life depicted on the screen. Included in the booklet can also be a short history of man's exploration of the deep such as conducted by Dr. Beebe, Professor Agusta Piccard and others.

Therefore, a feature of this invention resides in the provision of a submersible device constructed and arranged to physically demonstrate the laws of buoyancy.

It is another feature of this invention to provide an educational device including an aquarium in which the buoyancy of actual moving models of undersea vehicles can be physically demonstrated therein and placed under the control of an operator while at the same time having placed thereagainst a background of authentic reproductions of underwater life set in motion so as to impart the appearance of movement to the submersible vehicles, disposed in the aquarium.

Another feature of this invention resides in the construction and arrangement of a submersible object which can be readily maneuvered at the will of an operator in accordance with the laws of buoyancy.

Another feature of this invention resides in the provision of simulating authentic underwater scenes which are placed in motion so as to impart an apparent horizontal movement to a submersible toy constructed for vertical movement only.

Another feature of this invention is to provide a novel submersible device having a plurality of ballast compartments in which the buoyancy of the respective compartments are individually controlled so as to demonstrate the various changes in attitude of an underwater vehicle in accordance with the laws of buoyancy.

Other features and advantages will become more readily apparent when considered in view of the drawings and specifications in which:

FIG. 1 illustrates a front elevation view of the educational device of the instant invention.

FIG. 2 illustrates a plan view of the educational device of FIG. 1.

FIG. 3 is a fragmentary plan view of a modified form of the diffuser screen utilized in conjunction with the educational device of FIGS. 1 and 2.

FIG. 4 is a detail of construction illustrating a drive connection for the moving screen of FIGS. 1 and 2.

FIG. 5 is an end elevation view of the educational device of FIGS. 1 and 2 with the moving screen removed.

FIG. 6 illustrates a side elevation view of a submersible vehicle shown partly in section which is adapted to be utilized in conjunction with the educational device of FIGS. 1 to 4.

FIG. 7 illustrates an end view of the submersible vehicle of FIG. 6 in position within the aquarium or water box of FIGS. 1 to 4.

FIG. 8 is a top plan view of the submersible vehicle of FIGS. 6 and 7.

FIG. 9 is a side elevation view of a modified submersible type vehicle and control panel therefor.

FIG. 10 is a plan view of FIG. 8 illustrating the control connections to the submersible vehicle of FIG. 8.

FIG. 11 is an elevation view of the control means of FIG. 10.

Referring to the drawings there is shown in FIGS. 1 to 4 the setting in which the educational device of the instant invention is utilized, and which may be defined as an oceanarium 20. Accordingly, the oceanarium 20 comprises a base 21 with means thereon forming locaters utilized to accommodate and position on the base a water box or aquarium 22. As best seen in FIG. 2, the base 21 comprises a substantially triangular coplanar member which defines the support for the oceanarium. The locating means thereon comprises a pair of opposed upright abutments 23 between which there is located the water box 22.

As shown, the water box 22 comprises a relatively wide but narrow box defined by opposed end walls 22A interconnected by opposed side walls 22B and a bottom wall 22C to define a tank adapted to contain a body of water 24. The arrangement is such that the water box 22 can be readily lifted out from between the locating means 23 to facilitate the filling and/or emptying of the water therefrom. Preferably, the base 21 may be made of a durable plastic material and the water box likewise may made of the same suitable durable material, the side walls 22B of which are transparent.

In accordance with this invention, there is disposed adjacent each end of the water box 22 and slightly to the rear thereof a pair of rollers 25, 26 that are rotatably journalled on the base 21. If desired, one of the rollers may be hingedly connected to the base and held in vertical upright position as shown by means of a spring (not shown). This feature of the pivotal mounting of one roller enhances the placing and removal of the endless screen about the respective rollers, as will be hereinafter rendered more apparent.

Spaced to the rear of the respective guide rollers 25, 26 is a drive roller 27. As best seen in FIGS. 2 and 5, the drive roller is provided with a circumference which is greater than that of either of the guide rollers 25, 26. A means in the form of a suitable motor 28 is connected into driving relationship with the drive roller 27 to effect the drive thereof. As best seen in FIG. 4, the drive means comprises either a small mechanical spring wound or electric motor 28 which is provided with a spindle 29 which has connected to the end thereof a worm gear 30. The worm gear 30 in turn is arranged in meshing relationship with a drive gear 31 fixed to the roller 27. Thus, it will be apparent that whenever the motor 28 is energized, the roller 27 connected in driving relationship therewith revolves in response thereto. The endless screen 32 thus threaded about the respective rollers 25, 26 and 27 will have imparted thereto a continuous movement about the respective rollers whenever the motor 28 is actuated.

If desired, the motor means may comprise a variable speed motor, in which case the speed at which the screen 32 is moved about its respective rollers can be varied accordingly.

In accordance with this invention, it is contemplated that the screen 32 has depicted thereon various underwater scenes and marine life. For example, the illustrations of marine life on the screen are to be shown in their authentic settings. That is those specimens of marine life which appear near the surface of the water will be depicted against a relatively light blue background adjacent the upper end of the screen 32. The intermediate depth fish, as for example, the giant squid, deep diving whales, and giant jelly fish will be depicted at an intermediate portion of the screen against a deeper blue background. The deep seat fish or the abyssal fish will appear in their bio-luminescence against a deep blue background.

If desired, a plurality or set of interchangable screens may be provided. In this case, each screen will illustrate a given range of depth on which the marine life found within that given depth can be depicted on the screen.

In order to provide a wavering motion to suggest swimming of the marine specimens depicted on the screen, a light source 34 and reflector 35 in combination with a light diffuser panel 36 is disposed behind the screen 32. As best seen in FIG. 2, the diffuser panel 36, which is provided with serrated vertical lines, is disposed between the light source 34 and the screen 32. Accordingly, the diffuser panel 36 is positioned between the end guide rollers 25, 26 adjacent the rear of the water box 22 in juxta-position thereto. The light source 34 including a reflector 35 is spaced to the rear of the screen 32. Thus, when the screen is placed in motion, the diffuser panel 36, because of its serration will diffuse the light in such a manner that the pictorial illustrations of the undersea life on the moving screen 32 will have imparted thereto a seemingly waving motion which will suggest swimming. Thus, a constantly changing view of the submarine life will feature for example porpoises, giant squid, sharks, sperm whale, conger eels, giant jelly fish, sword fish and the abyssal carnivories such as the hatchet fish, viper fish, angler fish and etc. in seemingly swimming attitudes. If desired, in an alternate construction the light diffuser panel can be made as the back panel of the water box. FIG. 3 illustrates a modified diffusion which is provided with corrugation of non-uniform width to diffuse the light.

Sounds may be incorporated to augment the visual illustration depicted by the screen. Accordingly, the sound may be made by means of a continuous looped tape formed as a portion of the moving screen, and which is utilized in conjunction with a magnetic pickup and an associated amplifier and speaker (not shown). Accordingly, the sounds recorded on the tape will comprise actual underwater sounds that have been detected on actual explorations. Also, a black light may be utilized for creating a dramatic illumination of the marine life usually found in the sea. The use of the black light makes particularly effective that marine life found at the great ocean depths which have a bio-luminescence.

In addition to a screen depicting specimens of undersea life, the screen may also picture various underwater scenes including shipwrecks, the various formations of coral and/or the known geography of the ocean bottom.

In order to illustrate the physical laws of buoyancy there is utilized in conjunction with the oceanarium 20 described a submersible device 40 for use in the water box 22 to demonstrate the lows of buoyancy. As best seen in FIGS. 1, 6, 7 and 8, the submersible device 40 comprises a vehicle shaped in the form of a submarine hull or other suitable underwater vehicle. Accordingly, as shown, the hull 41 of the submersible device 40 is made relatively long in proportion to its width, and as seen in FIG. 7, the width of the hull 41 is slightly less than the width of the water box 22. Accordingly, the side walls 22B of the water box function as vertical guides for the submersible vehicle 40.

In accordance with this invention the submersible vehicle 40 is constructed and arranged so as to move vertically only within the water box, the apparent horizontal movement being accorded thereto via the moving screen 32. It is contemplated that the hull or body 41 of the vehicle be formed of a suitable plastic material having an opaque characteristic except for that portion which is to define the ballast tank or compartment 42 of the vehicle. Accordingly by rendering the ballast compartment portion transparent, it will permit observation of the displacement of water within the ballast tank to enhance one's understanding of the principle of buoyancy.

In the illustrated embodiment of the vehicle includes a cabin 43 which may be detatchably connected to the bottom of the body 41. Preferably, the cabin 43 is formed fluid tight to define a compartment adapted for receiving a dry cell storage battery 44 to provide a source of electrical power for observation lights 45 which may be located in the fore and aft portion of the body, as best seen in FIGS. 1 and 6. If desired, a no pitch propeller 46 may also be provided in the stern end of the hull 41 which is adapted to be driven by a small electrical motor (not shown) connected in circuit with the battery 44. Therefore, in order to lend authenticity to the vehicle, the propeller 46 may be placed in non functional rotation by energizing its motor.

As best seen in FIGS. 6 and 8, the fore and aft portions of the hull 41 are provided with apertures 47 which place the interior of the respective fore and aft portions of the body in communication with the water surrounding the same. Thus, the holes 47 provided permit fore and aft compartments of the hull to be completely flooded.

Partitions 48 intermediate the body define a ballast compartment 42 the top of which is provided with small tube or nipple 49 to which a clear, flexible, plastic air tube 50 is fixed. The other end of the flexible tube 50 has connected thereto a squeeze bulb 51 and a vent 52. As shown, the partitions are inclined to define a V-shaped ballast compartment to enhance the stability of the device. A hole 53 is formed in the bottom of the ballast compartment 42 to provide a means by which water is forced into and out of the ballast compartment 42.

Thus, in accordance with this invention, to effect submerging of the device 40, a bulb 51 is depressed and the vent valve 52 is opened. When the bulb 51 is about half empty, the vent 52 is closed, and the bulb 51 allowed to reinflate. Accordingly, this will cause water to come into the ballast tank 42 through the hole 53 at the bottom of the tank. Consequently, the intake of water within the ballast tank 42 changes the displacement and causes the device to dive or sink. The rate of diving, hovering, and surfacing are thus rendered readily controllable by squeezing the bulb 51 accordingly in an easy manner to add more or less air in tank 42. The arrangement is such that the device will rise and sink within the body of water depending upon the amount of pressure placed on the squeeze bulb. The V form of the ballast tank 42 enhances the stability of the vehicle and compensates for surges of ballast air.

Attached to the bottom of the cabin 43 is a weight 55 connected by a flexible strand 56 such as a brass chain or string. Accordingly, the weight 55 acts as a buffer when the device reaches the bottom of the tank 22. In operation, by squeezing and reinflating the bulb 51 at the end of the air tube 50 with the vent 52 thereof closed, buoyancy of the submersible vehicle is varied in accordance with the ratio of air to water displacement within the ballast compartment 42. Thus, by actual application and visual observation of the displacement within the ballast compartment 42 of the vehicle 40, the actual physical laws of buoyancy can be readily demonstrated and appreciated. Also, at the same time, by effecting the drive of the endless moving screen 32 relative to the water tank 22, the various underwater life as actually occurs in the ocean may be seen as moving past the vehicle.

FIGS. 9 and 10 are directed to a more sophisticated embodiment of the vehicle 60 constructed and arranged to more realistically illustrate the various attitudes of a submersible vehicle, as for example, a submarine, a bathyscaphe, or other vehicles used for ocean exploration. As best seen in FIG. 9, the model vehicle 60 is provided with a hollow hull 61 partitioned by suitable partitions 62, 63 to divide the hull into three ballast compartments, that is, the forward ballast tank 64, the center maneuvering ballast compartment 65 and the after ballast compartment 66. To each of the respective ballast compartments 64, 65, 66 there is connected a flexible conduit 67, 68, 69 for supplying air thereinto or for venting the air therefrom. The other end of the respective conduits are connected up to a diving control board or stand 70.

Accordingly, the diving control board or stand 70 is provided with means or controlling the flow of air to each of the respective ballast compartments 64, 65, 66 so as to separately vary and control the water displacement therein. Each of the ballast compartments is provided with an opening 71, 72, 73 disposed in communication with the surrounding body of water and through the water is permitted to be forced into and out of the respective ballast compartments.

As best seen in FIG. 8, the control stand includes a manifold of pipes to which there is connected a ballast blow valve and a ballast vent valve for each of the respective compartments. For example, as shown in FIG. 8, valves 74, 75 and 76 constitute the respective blow valves for the ballast compartments 64, 65 and 66 respectively, and valve 77, 78 and 79 constitute the respective vent valves for ballast compartments 64, 65 and 66 respectively. A source of air pressure, as for example, an air accumulator 80 is connected by suitable conduit means 81 to the inlet of each of the respective blow values 74, 75, 76. The outlet of the respective blow valves 74, 75, 76 in turn are connected to the respective flexible conduits 67, 68, 69 connected to the associated ballast compartments 64, 65, 66.

The inlet of the vent valves 77, 78, 79 are also connected in communication with the respective flexible conduit 67, 68, 69 of the respective ballast compartment 64, 65, 66 by means of a branch line 67A, 68A, 69A.

If desired, the air accumulator 80 is provided with a pump 82 utilized to build up the air pressure within the accumulator when the pressure therein falls below a predetermined pressure, and a pressure gauge 83 is connected to the air accumulator 80 and located on the face of the control stand 70 to indicate to an operator the pressure of the air within the accumulator 80. Also located on the control board 70 is a light switch 84 to control illumination of the oceanarium and/or the lights of the submersible vehicle. The control board 70 may also contain a speed control 85, in the event that a variable speed motor is utilized to effect the drive of the screen 32. Accordingly, the speed of the screen 32 can be varied to give the apparent illusion that the horizontal motion to the submersible device is changing also.

The battery source or electrical source for the lights 86 on the submersible vehicle 60 may be located directly in a water tight compartment 86 connected to the undersurface of the hull 61, as herebefore described with reference to FIG. 6.

In operation an operator may effect a displacement in any or all of the respective ballast compartments 64, 65, 66 of the vehicle 60 so that the attitude of the vehicle in the water can be changed at will. For example, by opening the respective blow valves 74, 75, 76 and closing the vent valve 77, 78, 79 controlling the respective ballast compartments of the vehicle and vise versa the ratio of air to water in each of the compartments can be controlled at will. Therefore, with the ballast compartments so controlled, the operator can control the up or down angle on the device 60. From the construction described it will be noted that an operator can change the up or down angle of the submersible vehicle while at the same time effect the raising and lowering of the same in any given attitude.

It will be noted that the vehicle of FIGS. 9 to 11 is also provided with a weight 87 extended beneath the bottom thereof for the same reason discussed with reference to FIG. 5.

If desired, a magnet may be substituted in lieu of the weight 87 connected to the bottom of the vehicle for picking up objects placed on the bottom of the water tank 22. Therefore, the instant device can be made more interesting by utilizing in conjunction therewith simulated objects of buried treasure which may be located in the bottom of the tank. In this case the submersible vehicle under the control of the operator may be utilized as a game for salvaging the sunken treasure. By point evaluating the various so called articles of sunken treasure in accordance with their size or ease of retrieving the same, an interesting and amusing game may be had requiring skill and control in the operation of the device.

While the submersible devices 40 and 60 illustrated and described may be constructed in the form of a submarine or bathyscaphe it will be readily appreciated and understood that the physical shape of the submersible device can vary and assume that of any shape which is in keeping with the underwater theme of this invention.

From the foregoing it will be seen that the structure of the educational device is relatively simple, it can be easily fabricated, and it is positive in operation. The device in addition to being capable of actually demonstrating the physical law of buoyancy, further can be utilized to increase one's interest, knowledge and appreciation of underwater life and oceanography in general.

While the instant invention has been described and illustrated with reference to several embodiments thereof it will be readily appreciated and understood that variations and modifications thereof may be made without departing from the spirit and scope of the invention.

What is claimed is:

1. An educational toy comprising:
    (a) a base,
    (b) a relatively narrow water tank supported on said base,
    (c) an endless screen mounted on said base behind said tank whereby said screen is viewed by looking through said water tank, said screen depicting underwater scenes,
    (d) means for effecting movement of said screen,
    (e) means for illuminating said screen,
    (f) and a light diffuser disposed between said illuminating means and said screen, said diffuser including means to vary the amount of light penetrating therethrough to impart an optical illusion of motion to the scene depicted on said screen.

2. An education device comprising:
    a base,
    a water tank supported on said base,
    an endless screen mounted on said base behind said tank, said screen depicting underwater scenes,
    means for effecting movement of said screen, and including:
        a submersible device positioned in said tank,
        said device having a compartment,
        means for flooding said compartment,
        and means operatively connected to said compartment for effecting the displacement of the water therein with air to illustrate the laws of buoyancy.

3. The invention as defined in claim 2 and including means for illuminating said screen a light diffuser disposed between said illuminating means and said screen said diffuser panel including means to vary the amount of light penetrating therethrough to impart an optical illusion of motion to the scene depicted on said screen.

4. An educational device comprising:
    a base,
    a water tank removably supported on said base,
    a plurality of rollers mounted on said base,
    an endless screen threaded about said rollers, said screen depicting under water scenes,
    means for effecting the drive of one of said rollers for moving said screen, and including:
        a hollow body shaped in the form of an underwater vehicle disposed in said tank,
        means partitioning said body into a plurality of ballast compartments for varying the submerged attitude of the body,
        each of said ballast compartments having a hole formed in a wall portion thereof to permit water to be forced into and out of said associated ballast compartment,
        means for individually controlling the displacement of water to and from each of said compartments to vary the attitude of said body in the water,
        said latter means including a control panel remotely disposed from said body,
        said control panel including a blow valve and a vent valve for each of said compartments,
        a flexible conduit connecting each of said valves to its respective compartment,
        a source of air pressure connected through the respective blow valves to each of said compartments whereby the opening of the respective blow valves and closing of the associated vent valve and vice versa effect a change in the buoyancy of the associated compartment,
    and means for varying the speed of said screen.

5. A toy comprising:
    (a) a base,
    (b) a tank formed of translucent material adapted to hold water removably supported on said base,
    (c) a pair of spaced apart idler rollers rotatably journalled on said base adjacent the ends of said tank and disposed to the rear thereof,
    (d) a driving roller spaced from each of said idler rollers said driving roller being rotatably journalled on said base,
    (e) an endless screen threaded about said rollers, said screen having depicted thereon an underwater scene,
    (f) means for effecting the drive of said drive roller whereby said screen is moved about said guide rollers in an endless path,
    (g) a planar portion of said screen between adjacent rollers being disposed adjacent the back of said tank whereby said screen may be readily viewed through said tank,
    (h) a light source for illuminating said screen,
    (i) and a means disposed between said light source and said screen to diffuse said light evenly onto said screen,
    (j) said defuser means comprising a panel substantially coextensive in area to the back of said tank, and said panel being provided with serrated lines to vary the amount of light penetrating thereto for obtaining an optical illusion of motion to the scene depicted on said screen.

6. An amusing educational toy depicting undersea life comprising:
    (a) a platform member,
    (b) a tank adapted to contain a supply of water supported on said base,
    (c) spaced apart rollers rotatably journalled on said platform member adjacent said tank and disposed to the rear thereof,
    (d) an endless screen depicting underwater scenes threaded about said rollers, said screen being stretched over said roller so as to be in frictional driving relationship therewith,
    (e) means for effecting the drive of said rollers,
    (f) said means including a motor means operatively connected in driving relationship with one of said rollers whereby actuation of said drive means effects operation of said rollers and movement of said screen about said rollers,
    (g) said screen having a planar portion thereof disposed closely adjacent the back of said tank,
    (h) a light source mounted on said platform behind said screen to illuminate the same,
    (i) and a diffuser panel imposed between said light source and said screen planar portion to impart an optical wavering movement to suggest swimming of the fish life depicted on said screen.

7. The invention as defined in claim 6 and including means to vary the speed of said screen.

8. The invention as defined in claim 6 and including:

(a) a submersible device located in the water within said tank,
(b) and means under the control of an operator to control the movements of said submersible device in said water.

9. An amusing educational toy depicting undersea life comprising:
(a) a platform member,
(b) a tank adapted to contain a supply of water removably supported on said member, said tank having a relatively very narrow width in proportion to its length,
(c) means for locating and positioning said tank on said platform member,
(d) a pair of spaced apart guide rollers rotatably journalled on said platform member adjacent said tank and disposed to the near thereof,
(e) an endless screen depicting under water scenes threaded about said rollers, said screen being stretched over said rollers so as to be in frictional driving relationship therewith,
(f) a driving roller rotatably journalled to said platform,
(g) means for effecting the drive of said rollers,
(h) said means including a motor means operatively connected in driving relationship with said drive roller, whereby actuation of said drive means effects operation of drive rollers and movement of said screen about said rollers,
(i) said screen having a planar portion thereof extending between said idler rollers and disposed closely adjacent the back of said tank,
(j) a light source mounted on said platform behind said screen to illuminate the same,
(k) and a diffuser panel imposed between said light source and said screen planar portion to impart an optical wavering movement to suggest swimming of the fish life depicted on said screen.

10. The invention as defined in claim 9 and including:
(a) a body adapted to be submerged in the water in said tank,
(b) means defining a compartment in said body to form a ballast tank,
(c) said ballast tank having a hole therein disposed in communication with the water surrounding said body, and
(d) means connected to said ballast tank to vary the displacement of water within said tank and thereby vary the buoyancy of said body to control the rise and fall of said body within said water.

11. An amusing educational toy depicting undersea scenes and fish life therein comprising:
(a) a substantially triangular platform member,
(b) a tank adapted to contain a supply of water removably supported on said member, said tank having a relatively very narrow width in proportion to its length,
(c) means for locating and positioning said tank on said platform member whereby said means are disposed adjacent the base end of said triangular platform,
(d) a pair of spaced apart guide rollers rotatably journalled on said platform member adjacent the ends said tank and disposed to the rear thereof,
(e) a driving roller rotatably journalled to said platform adjacent the apex thereof,
(f) an endless screen depicting underwater scenes threaded about said rollers, said screen being stretched over said rollers so as to be in frictional driving relationship therewith,
(g) means for effecting the drive of said rollers,
(h) said drive means including a motor means operatively connected in driving relationship with said drive roller whereby actuation of said motor means effects operation of drive rollers and movement of said screen about said rollers in an endless path,
(i) said screen having a planar portion thereof extending between said idler rollers disposed closely adjacent the back of said tank,
(j) a light source mounted on said platform behind said planar portion to illuminate the same,
(k) and a diffuser panel imposed between said light source and said planar screen portion to impart an optical wavering movement to suggest swimming of the first life depicted on said screen.

12. The invention as defined in claim 11 and including:
(a) a submersible device located in the water within said tank,
(b) means defining a compartment in said device,
(c) means for flooding said compartment with water,
(d) and means under the control of an operator to displace the water in said compartment with air to control the movements of said submersible devices in said water.

References Cited
UNITED STATES PATENTS

| | | | |
|---|---|---|---|
| 739,236 | 9/1903 | Thompson | 272—17 |
| 2,033,130 | 3/1936 | Eitzen | 40—32 |
| 2,371,172 | 3/1945 | Hotchner | 40—106.5 |
| 3,077,697 | 2/1963 | Fry | 46—92 |

FOREIGN PATENTS 658,070  10/1951  Great Britain.

EUGENE R. CAPOZIO, *Primary Examiner.*

H. S. SKOGQUIST, *Assistant Examiner.*